Aug. 15, 1967  M. L. HEINZ  3,335,998
FAST-CLOSING VACUUM VALVE
Filed Oct. 22, 1965  4 Sheets-Sheet 1

INVENTOR.
MARVIN L. HEINZ
BY Roland A. Anderson
ATTORNEY

Aug. 15, 1967 M. L. HEINZ 3,335,998
FAST-CLOSING VACUUM VALVE
Filed Oct. 22, 1965 4 Sheets-Sheet 3

INVENTOR.
MARVIN L. HEINZ
BY Roland A. Anderson
ATTORNEY

Aug. 15, 1967  M. L. HEINZ  3,335,998

FAST-CLOSING VACUUM VALVE

Filed Oct. 22, 1965  4 Sheets-Sheet 4

INVENTOR.
MARVIN L. HEINZ

BY Roland A. Anderson

ATTORNEY

United States Patent Office 3,335,998
Patented Aug. 15, 1967

3,335,998
FAST-CLOSING VACUUM VALVE
Marvin L. Heinz, Sunnyvale, Calif., assignor to the United States of America as represented by the United States Atomic Energy Commission
Filed Oct. 22, 1965, Ser. No. 502,706
9 Claims. (Cl. 251—25)

ABSTRACT OF THE DISCLOSURE

A valve having a disk hinged at a conduit end that lies in a plane at an acute angle to the conduit's central axis. A crossbar engages the disk and is flexibly attached to a shaft normally latched against a compressed spring. With the shaft latched, the disk is in a position away from the conduit end. Electromagnetic unlatching of the shaft enables the spring to move the shaft, crossbar and disk so that the disk is against the conduit end and is held there. Movement of the parts is snubbed by an air-cushion assembly at one end of the shaft.

The invention disclosed herein was made under, or in, the course of Contract No. AT(04-3)-400 with the United States Atomic Energy Commission.

---

The present invention relates generally to bakeable, high-vacuum valves, and more particularly to a fast-closing, all-metal, radiation resistant, high-vacuum valve of a construction which can provide line-of-sight communication, e.g., between wave-guide sections of a linear accelerator and is especially adapted for outgassing as by heating.

In linear accelerators, generally, and especially in the case of extremely long high energy linear accelerators, in order to minimize down-time it is desirable to insert a series of relatively fast-acting vacuum valves at spaced intervals along the accelerator waveguide tube to close-off defective sections and maintain the existing vacuum environment in the remainder. Such valves may be actuated by vacuum deterioration sensing means in communication with the vacuum environment within the accelerator waveguide. Accordingly, damage and gas absorption by the accelerator components is limited to an isolated portion. Further, due to the radiation environment which is present, for example, in high energy linear accelerators, there exists in addition the requirement that all materials in the isolating valves be radiation resistant. A very high energy accelerator is an extremely large and costly device for which operation with a minimum of down-time for repairs of the device is imperative to reduce operating expenses. Accordingly, it is desirable that the isolating valves be extremely durable and trouble-free. In general, prior art valves utilized for isolating sections of a linear accelerator waveguide have employed non-metallic vacuum sealing surfaces as well as sliding or rolling parts which are required to function within the vacuum and high energy ionizing radiation environment present therein. Such prior art valves have evidenced a relatively short life time and uncertain reliability within the high-vacuum, radiation environment due to galling and rapid wear of sliding and rolling parts. The situation is aggravated in that prior art high-speed valves generally utilize a mechanism of relatively long stroke for closure of the seal means. This necessitates high travel speeds for rapid closure thereof, resulting in the development of severe impact loads on wear and closure components which, especially in a radiation-vacuum environment, leads to shortened valve life.

The high-vacuum valve of the present invention overcomes the abovenoted shortcomings of prior art valves by providing a relatively fast-acting valve constructed of materials capable of withstanding extreme radiation environments, wherein the valve has no rolling or sliding parts exposed to the vacuum-radiation environment. The valve of the present invention has a low moving mass closure system with short stroke length effective to minimize the closure impact of wear and galling susceptible parts of the valve. The valve is capable of automatic operation from a remote location with means provided to monitor operation and is adaptable to provide unobstructed line-of-sight communication between adjacent vacuum conduit sections, e.g., the wave-guide section of a linear accelerator or similar portion of any other vacuum system.

Accordingly, it is an object of the present invention to provide a fast-acting radiation-resistant high-vacuum valve.

It is still another object of the invention to provide a fast-acting vacuum valve having a closure system with relatively short travel and exerting a minimal impact effect on components susceptible to wear or galling in a high-vacuum, radiation environment.

Still another object of the invention is to provide a relatively fast-acting high-vacuum valve having extreme reliability and long life—thereby requiring a minimum of maintenance.

It is still another object of the present invention to provide a high-vacuum valve which can be inserted in in-line relation within an accelerator tube or other like tubular device, utilizing an unobstructed line-of-sight aperture configuration, wherein the valves add a minimum amount to the overall tube length.

Yet another object of the invention is to provide a high-vacuum valve constructed entirely of materials which are resistant to high energy ionizing radiation and are adapted for high-vacuum service.

Other objects and advantages will be apparent in the following description and claims considered together with the accompanying drawings, in which:

Figure 1:
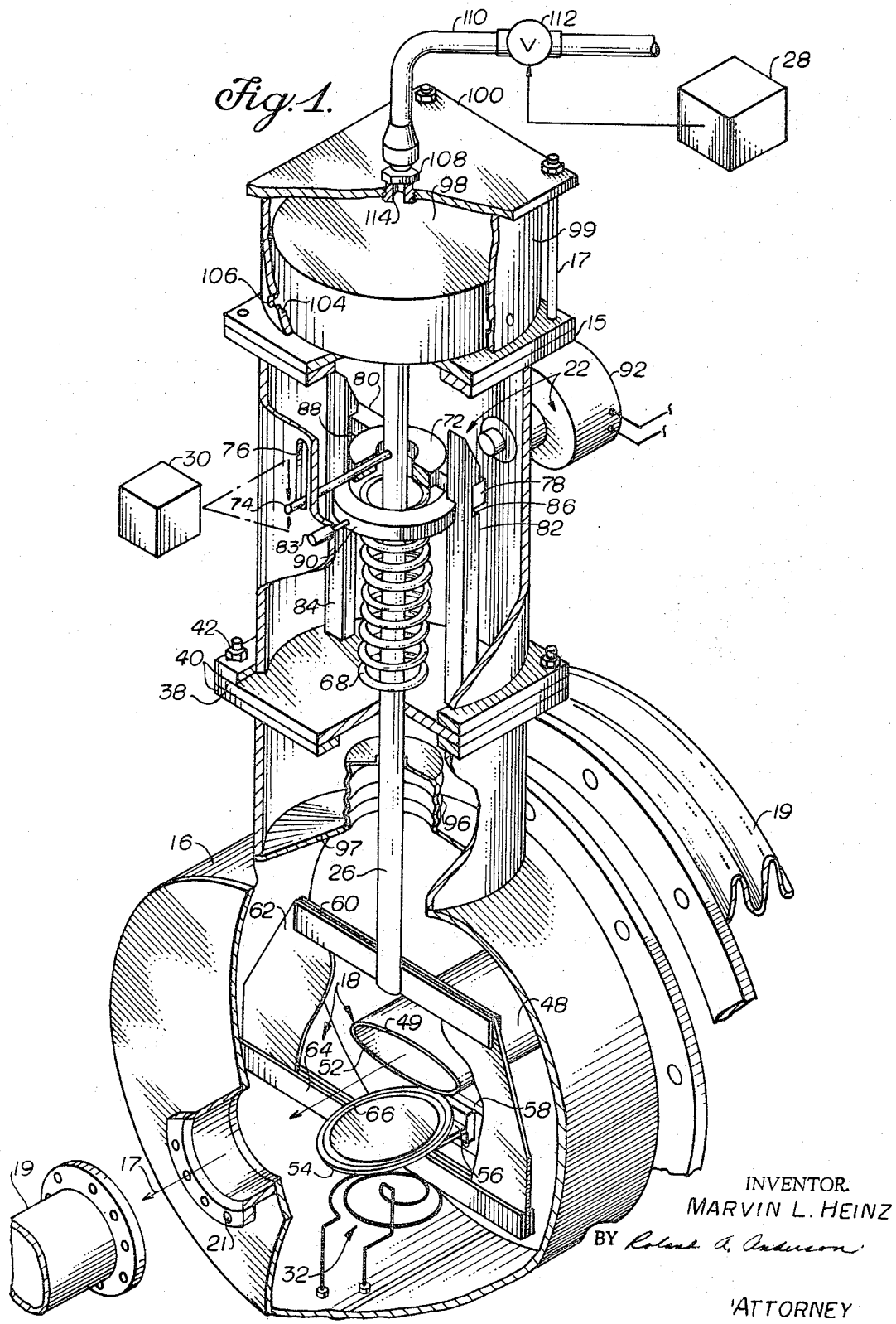
FIGURE 1 is a perspective view of a simplified version of a valve constructed in accordance with the invention with housing portions broken away to better exemplify the construction and operation thereof.

Succinctly, with reference to FIGURE 1 of the drawing the general schematic arrangement of the principal components of a vacuum valve 10 in accordance with the invention, includes, for structural purposes, a housing or body 11 having a generally tubular or equivalent portion 12 and an upper plate 14 demountably attached thereto at the outer end as by flange 15 and bolts 17 to inclose and/or support actuating mechanism. The housing also includes a valve body 16 which can typically be of generally truncated cylindrical form in which is disposed valve seal assembly 18 and to the radial wall of which the lower end of portion 12 is secured as by welding. The valve seal assembly includes a beam tube 48 the longitudinal axis of which provides a convenient reference for locating components of the device. An opening is formed in said radial wall or otherwise as appropriate for communication between the interiors of body 16 and support portion 12 for disposition of actuating means. The body 16 is adapted for installation to close off aligned conduit sections or parts of a vacuum conduit, for example, the acceleration tube of a linear charged particle accelerator herein depicted as axially aligned microwave waveguide sections 19 through which a high energy electron or other beam 17, microwave driving power, evacuated gases and other motile materials in the system pass. For such installation the flat end plates of body 16 may be ported and provided on one side, e.g., with a rigid flange coupling 21 and on the distal side with a flexible flange coupling assembly 23 in coaxial alignment with wave guides 19 and the passage through valve seal assembly 18. The foregoing seal assembly and other assemblies discussed in the present general schematic résumé will be described in detail hereinafter. It will be appreciated that in other uses a line of sight communication may not be necessary or is not desired. In such cases, either one or both of the conduit connections can be bent or offset and the attachment of at least flange coupling 21 to body 16 may be at any angle with respect to tube 48. Moreover, the housing can take forms other than that shown as long as certain alignments necessary to obtain specified mechanical movements discussed hereinafter is preserved. The valve seal assembly 18 is actuated by a shaft 26, extending in sealed relation through the aforesaid radial wall opening in body 16 to be coupled to a spring-loaded reciprocating drive assembly 20, which is triggered by means of a valve actuating assembly 22, both of which are disposed within support member 12. To prevent excessive valve closure speeds and thus excessive closure impact load between mating components, the valve seal assembly 18 is coupled to double-acting air cylinder cushion or similar actuating-snubbing assembly 24, e.g., by means of the shaft 26. The air cushion assembly 24 is coaxially secured to or fashion integrally with the housing 12 with an arrangement in which the shaft 26 extends radially from the enclosure 16 and coaxially within the support portion 12 to engage the piston of air cushion assembly 24. The air cushion assembly is arranged so that a small air leak exists from the volume below the piston, e.g., as around the shaft 26 and bottom end of the cylinder. For opening the valve 10 air pressure is introduced to the assembly 24 above the piston from an exterior source 28 to impart downward movement to the shaft 26 and integrally connected valve seal assembly 18, thereby simultaneously opening the valve seal assembly 18, while re-cocking the spring-loaded valve drive assembly 20, and to return the valve 10 to a normally opened position in readiness for closing the valve when such action is necessary. Switch means 30 is secured to the housing 12 and is actuated by the shaft 26 and pin 74 extending therefrom by movement of the shaft 26 to normal operating limits in up or down position, to remotely indicate via an external circuit (not shown) the closed or opened position respectively of the valve seal assembly 18. In the valve seal assembly 18 there is preferably utilized a low-melting point adherent metal of low vapor pressure and non-corrosive properties to effect an effective vacuum seal between valve seal seating surfaces. A spiral electrical heater element assembly 32 is disposed adjacent the valve seal assembly 18 in body 16 to provide the heat necessary to melt the seal-seat material at such time as the valve is open for seat reforming or to assist in outgassing valve components.

Figure 2:
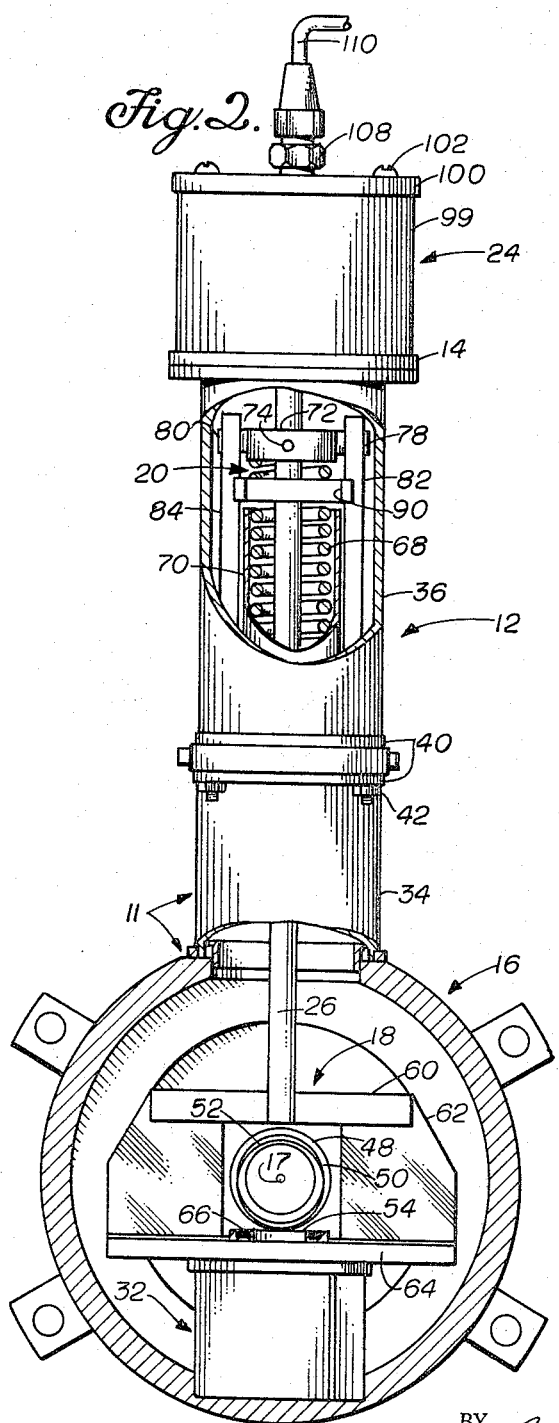
FIGURE 2 is a vertical, longitudinal cross-section view of the valve of FIGURE 1.
Figure 3:
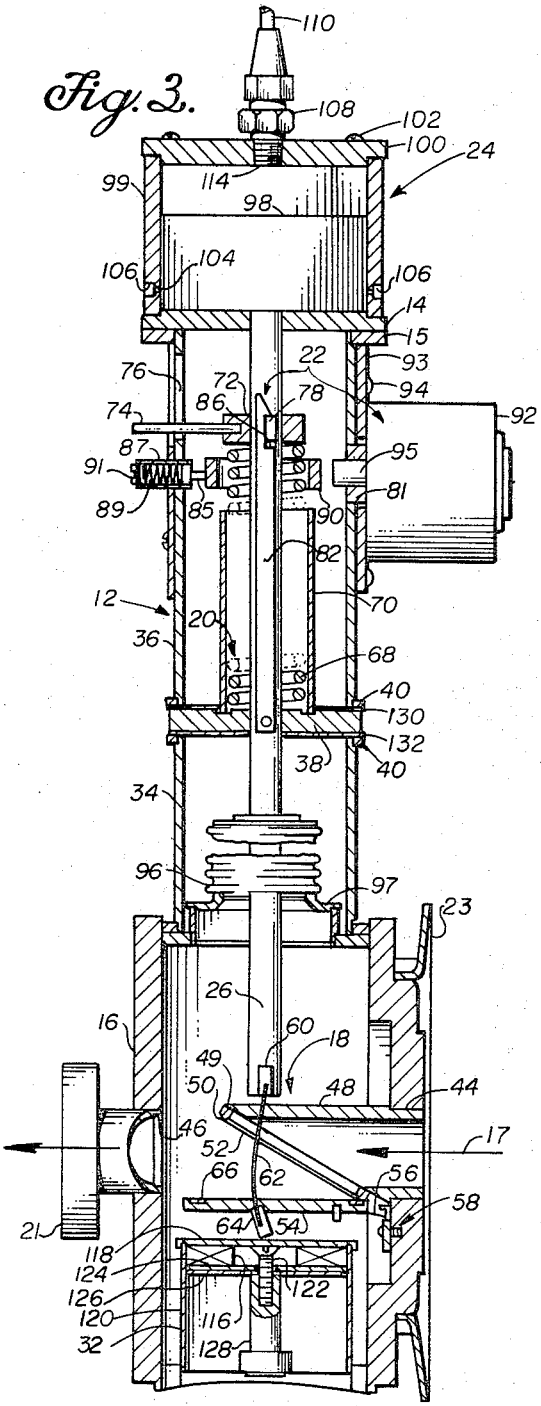
FIGURE 3 is a vertical transverse cross-section view of the valve of FIGURE 1.

More specific details related to a preferred embodiment will now be described with reference to FIGURES 2 and 3. Tubular housing portion 12 may be advantageously formed with lower section 34 and upper section 36, separated by a support plate 38, and held together in coaxial alignment by means of flange 40 welded to the adjacent ends of the sections 34, 36 and coupled by means of bolts 42. Although a single housing structure such as that shown in FIGURE 1 could be utilized in the construction of valve 10, the demountable double section assembly of FIGURES 2 and 3 is preferred for ease of construction and assembly. Since the volume of housing 12 is exposed to the atmosphere and since housing 12 merely defines a support for actuating mechanism of the valve, it could be replaced by any combination or form of support members, e.g., vertical flat plates, bolts, or struts, etc.

Consider now the unique valve seal assembly 18 of previous mention. The sealing assembly 18 is disposed within the valve body 16 with a beam tube portion 48 in general coaxial unobstructed line-of-sight alignment with a beam input aperture 44 and a beam exit aperture 46 defined in the distal sidewalls of the enclosure 16 by flanged ports 21, 23. The beam tube 48 may be integrally secured at one end thereof circumjacent within the beam input aperture 44 and extend therefrom coaxially into the volume within body 16 with the innermost end cut diagonally at an angle of approximately 30° and disposed with the side terminating in apex 49 oriented toward housing portion 12. The diagonal end of tube 48 terminates in an oval surface 50, which is oriented at an angle to the axis of body 12 facing diametrically away or downward away from housing portion 12. The angle at which the end of tube 48 is cut is not limited to 30° but may lie within the range of, for example, from 20° to 45°, the limits thereof being determined by the length dimension of body 16 necessary to accommodate the oval surface formed, desired speed and length of shaft travel, etc. An oval, continuous knife edge 52, of dimensions corresponding to those of surface 50, is integrally secured thereto, and being in a stationary position provides a sealing ridge oriented at approximately 30° to the axis of body 16 and encircling beam 17. A movable oval closure disc 54 is disposed to occupy an open horizontal position parallel to said axis in the region below the knife edge 52, and is secured in hinged relation to one end wall to enclosure 16 by a hinge member 56 formed, preferably, as a flexible bundle of thin flexible metal sheets such as multiple layers of stainless steel 302 shim stock or other weldable corrosion-resistant, vacuum compatible metal sheets. Member 56 is adjustably secured to the sidewall by welding or brazing one end into a slotted block retainer 58 bolted to the endwall of housing 16. The oval disc 54 swings through a small arc with supple flexing of the member 56 and thus may be urged upwardly to contact knife edge 52 to effect the enclosure of tube 48 and thus of the valve 10.

For effecting the desired motion of disc 54 a crossbar 60 is horizontally secured to the lower end of the shaft 26 in transverse relation above the tube 48. Thin flexible members 62, preferably formed of the same material as member 56, are secured terminally to the crossbar 60 to extend downwardly to be attached similarly to crossbar 64 disposed below and supporting disc 54. Means for securing flexible members 56 and 62 may comprise welding at a location removed from the highly flexed and stressed areas. All moving parts of the assembly 18 are preferably formed of a high strength, corrosion-resistant metallic materials adapted for high-vacuum service, e.g., stainless steel (S.A.E. 302). Upward movement of the shaft 26 pivots the seal-seat disc 54 about the end affixed to flexible member 56. Compensation for any component misalignment is provided by flexible members 62 and 56 without any need of sliding members or rotating shafts. It is to be noted that the flexibility of members 62 and 56 allows dimensional conformance between moving parts necessitated with the sealing action. It is also to be noted that disc crossbar 64 is located with due regard to the center of percussion of the pivoting mass as well as the moments applied to the moving mass by the flexible members during their action. Appropriate location of disc crossbar 64 as determined by adjustment and visual observation during assembly enhances the dynamic behavior of the pivoting mass assembly providing minimal strain on mechanism and assures planar contact between disc 64 and knife edge 52 valve closure.

The actual vacuum seal is effected between the oval knife edge 52 and the matching, oval, continuous seal-seat 66, formed by filling a groove in the upper surface of the seal-seat disc 54 with a soft metal as mentioned supra. The material used for the seal-seat 66 is preferably indium metal, which has a low melting point, which can be readily re-formed an indefinite number of times and has ideal characteristics for use in high vacuum environments. It is to be understood that the particular configuration of the disc and continuous indium seal-seat are suitable to be utilized as the seal means for the present valve, under most stringent operating conditions, i.e., where it has to be baked and/or to operate at high temperatures, very high vacuums, and/or under high radiation conditions, etc. Various other seal edge-seat configurations or materials could be utilized in place thereof under less severe operating conditions.

The spring-loaded valve drive assembly 20 of previous mention utilizes a helical compression spring 68 disposed about the shaft 26 with the bottom end thereof resting against the upper surface of spring support plate 38. A spring positioning sleeve 70 (shown in FIGURES 2 and 3) is secured to the plate 38 and extends upwardly therefrom about the spring 68 to prevent buckling thereof. A spring retainer collar 72 is placed about the shaft 26 and is demountably pinned thereto by one end of radially extending pin 74. The other end of pin 74 extends distally outward to protrude through an axially extending slot 76 formed in the wall of the upper housing section 36 to actuate switch 30 mentioned above. Collar 72 is pinned to shaft 26 at a selected distance from the spring support plate 38 to provide the desired initial compressive force when the valve drive assembly 20 is cocked; i.e., when the valve 10 is in the open position. A pair of latch bars 78 and 80 are integrally secured as by brazing to extend in diametric opposition to the outer periphery of the collar 72. It is to be noted that the inside diameter of collar 72 is larger than the outside diameter of shaft 26, and that it is loosely pinned thereto by pin 74 to allow tilting of collar 72 and attached latch bars 78, 80 about pin 74. Accordingly both bars 78, 80 will bear equal amounts of the force exerted by the spring 68 and provide a smoother functioning of the valve actuating assembly while reducing the tendency of shaft 26 to bind or rotate.

For coupling the valve actuating assembly 22 of previous mention to operate in conjunction with the spring-loaded valve drive assembly 20, a pair of latching hooks 82 and 84 having tapered upper ends are pivotally secured to the spring support plate 38 at their lower ends, and extend upwardly in approximately parallel relation with the shaft 26. Proximate the upper ends of latching hooks 82, 84 transverse grooves 86, 88 provide the hook engagement portions which receive and bear against the same side of latching bars 78, 80, respectively when the valve 10 is in the cocked, i.e., open, position. The contacting edges of the latch grooves 86, 88 are preferably slightly rounded to prevent excessive stress from occurring upon disengagement from bars 78, 80. An annular ring 90, disposed about the shaft 26, is integrally secured as by welding, to the latch hooks 82, 84 at diametric opposition points. Thus ring 90 and integrally secured latch hooks 82, 84 form a rigid structure which pivots away from a vertical position as a unit through a small angle about the pinned lower ends of the hooks 82, 84 to provide simultaneous releasing of the latching bars 78, 80 respectively. An electrically operated solenoid 92 is secured, as by means of a mounting plate 93 and screws 94, to the outside circumference of the upper housing section 36 with the plunger 95 of the solenoid 92 extending radially inward to bear against the outer circumference of the annular ring 90. Activation of the solenoid 92 then drives the plunger 95 against the ring 90 causing the latch hooks 82, 84 to pivot away from the latching bars 78, 80 respectively. A spring-loaded centering device 83 is secured to upper housing section 36 in diametrically opposed relation to the solenoid 92, to apply a force against the ring 90 opposing that force exerted by the solenoid plunger 95. To this end, the spring centering device 83 utilizes a positive-stop plunger 85 disposed within a plunger housing 87 and having a tip which bears against ring 90, a compressible spring 89 disposed to bear against the plunger 85, and a spring retaining adjustable set-screw 91. At such time as solenoid 92 is deactivated, spring 89 urges plunger 95 against the annular ring 90, thereby returning the latch hooks 82, 84 to a central position within housing 12, preparatory to, and during, the recocking of the valve 10 mechanism. A cylinder 81 surrounding the plunger 95 serves as a stop for ring 90 at the appropriate limit of travel.

A flexible bellows 96 is secured in sealed relation at its upper end to the shaft 26 and at its lower end to the bottom end of the lower housing section 34 by means of a radially outwardly extending skirt 97 to isolate the volume within the enclosure 16 from atmospheric conditions which exist in the housing 12, while simultaneously allowing reciprocating movement of the shaft 26 within the housing 12.

Considering in greater detail the air cushion assembly 24 of previous mention, a piston 98 is coaxially located above the end of the shaft 26 and adapted to reciprocate within a cylindrical piston housing 99 secured to the upper housing section 36. An end plate 100 is sealed to the open end of the piston housing 99 by demountable means, such as for example, bolts 102 which extend from the seal end plate 100, through the housing end plate 14 and the housing flange 15 and are then secured by nuts. A continuous groove 104 is formed about the inside circumference of the piston housing 99, said groove 104 being spaced from the top of the housing end plate 14 a distance equal to approximately one third of the piston 98 travel. The groove 104 communicates with the outside atmosphere by means of a plurality of holes 106 formed through the wall of the housing 99 along the groove 104. It is to be noted that piston 98 has no seals and is purposely fitted to allow limited blow-by between the piston 98 and the housing sidewalls. Thus air trapped beneath piston 98 is allowed to escape at a controlled rate into the groove 104 upon opening of the valve 10 and is prevented from building up excessive pressure under piston 98; however, the piston functions as a damping means upon rapid closure of the valve 10 due to the controlled rate of air escape.

An air fitting 108 is threadably secured at one end to the seal end plate 100, and the other end is connected to an air supply tube 110 which has length and inside diameter commensurate to the amount of damping required for the air cushion assembly 24; for example, a length and diameter of the order of ten feet minimum and 5/16 inch, respectively. A three-way valve 112 is inserted in the air supply tube 110 and provides the means for coupling the high-pressure air supply 28 to the volume within the air cushion housing 99 above the piston 98. An orifice bushing 114 is pressed within the throat of the air fitting 108, and can be drilled to provide a predetermined size orifice therethrough for restricting air escape from the cushion assembly 24 and thus can determine the rate of air escape requisite to piston damping.

Consider next the electrical heater element assembly 32 of previous mention, the actuation thereof is best effected by means of an energizable heater coil 116 recessed concentrically within a cover 118 of a cup-like heater member 120. The heater member 120 is inverted and secured, as by brazing along the open lower periphery thereof to an opening in the valve seal support enclosure 16, with the cover 118 thereof disposed in horizontal relation immediately below the disc 54 when the valve 10 is in the open position. A threaded stud 122 is coaxially secured by welding at the head end thereof to the cover 118. A sheet of refractory material 124 and a metal retaining plate 126 are disposed against the heater coil 116, and a retaining bolt 128, having a threaded bore with threads matching those of threaded stud 122, is screwed upon the stud 122. Tightening bolt 128 upon stud 122 urges the metal retaining plate 126 against the refractory sheet 124 and coil 116, to confine the latter against the cover 118. The heater coil 116 is energized by means of a suitable electrical power supply (not shown) electrically connected thereto.

In assembling the various components of the valve 10, care is taken to insure that disc 54 is in a horizontal position when the valve 10 is open, to melt the indium metal seal-seat 66. Also, when the valve is in the open position, there should be an adjustable gap or space between the bottom of piston 98 and the adjacent surface of housing end plate 14. To provide for such adjustments, the effective lengths of housing sections 34, 36 are variable by means of shims 130 placed between the plate 38 and upper housing section 36, and shims 132 placed between the plate 38 and lower housing section 34. Accordingly, by first vertically adjusting the slotted plate and bolt assembly 58 relative to tube 48, and by next adjusting the thickness of shims 132 under plate 38, exact horizontal positioning of disc 54 at the desired distance from the knife-edge 52 is effected. Thereafter, the thickness of shims 130 is adjusted to provide the above-mentioned spacing between the piston 98 and housing end plate 14. Generally, such adjustments in housing length are more readily accomplished utilizing a light replacement spring of lesser strength in place of the spring 68 which is used in the operational valve and which is much more difficult to compress. After the slotted plate-block and bolt assembly 58 is in proper position, it is welded to the wall of enclosure 16, and the bolts used to hold it during the adjustment thereof are removed to minimize "virtual leaks" into the vacuum system due to trapping of air behind the bolts with slow and continuing leakage therefrom.

Upon proper adjustment of the housing length, the valve 10 is assembled with the operational heavier spring 68, and the valve is operated with the orifice bushing 114 installed. The bushing 114 initially has an undersize opening therein to provide excessive damping action on piston 98 to avoid damage during test operation, "debugging," etc. The bushing 114 is then successively enlarged or provided with a variable orifice device, to provide the proper amount of damping for the particular valve being assembled. Adjustment of damping to provide smooth, valve closure with no disc bounce, a minimum of valve closer impact, and yet a positive closure within a period of 9 milliseconds is easily effected. For determining the orifice bushing 114 hole size any convenient motion indicating means, e.g., a wire wound potentiometer and a cathode ray oscilloscope (not shown) are used to determine the character of motion of the shaft 26, and thus the closing action of the valve 10. The wiper of the potentiometer provided with a D.C. potential is fastened to the pin 74 and the oscilloscope is electrically coupled to the output of the potentiometer. The trace of the oscilloscope is triggered upon the energization of the solenoid 92. After each drilling or other adjustment of the orifice size of bushing 114, the valve is again tested with the bushing installed and the trace is watched until the valve closes with the desired characteristics, e.g., within 9 milliseconds. In general, the bushing hole diameter is initially of about 1/8 inch, and usually of about 13/64 inch diameter when drilled to the size necessary for desired valve damping. When comparing a series of assembled valves, the final bushing sizes may vary on the other of 1/64 inch.

Figure 4:
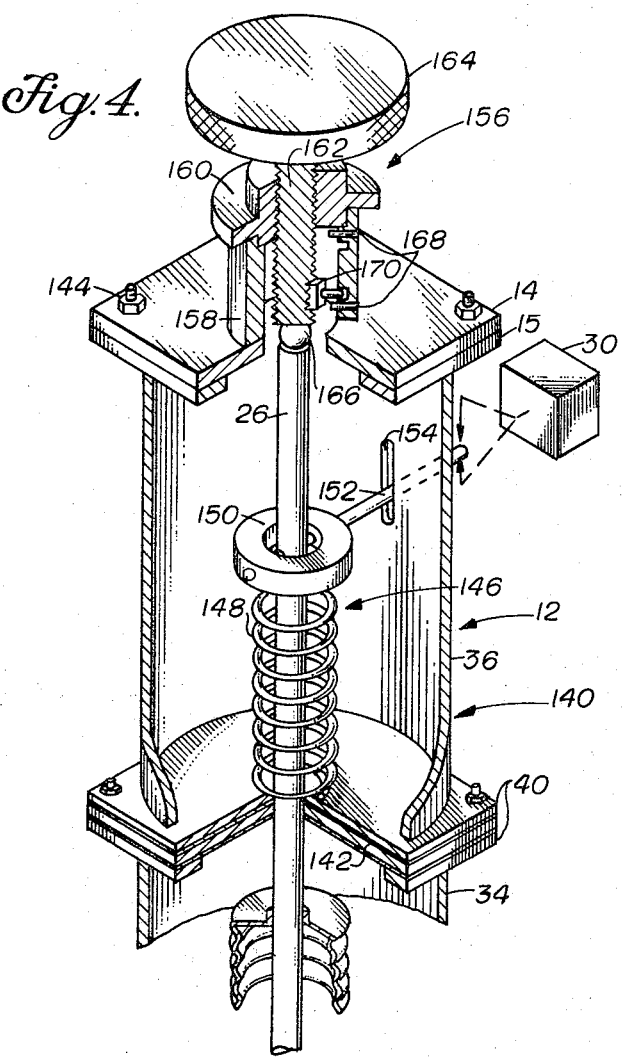
FIGURE 4 is a perspective view of a valve similar to FIGURE 1 but depicting a modified embodiment.

Referring now to FIGURE 4 there is shown a valve 140 of the present invention, exemplifying a variation thereof utilizing a modified valve actuation system. The variation employs the housing 12, formed of the upper and lower housing sections 36 and 34 respectively of the valve 10 of FIGURES 1–3. The sections are secured together by means of the adjacent flanges 40 and bolts 42, wherebetween is disposed a spring-support plate 142 similar to plate 38 of FIGURE 1, but lacking the holes in which the latch hooks are pivotally secured. The shaft 26 extends coaxially through an axial hole in plate 142, with the upper end thereof disposed through an axial hole in the housing end plate 14 substantially flush with the upper surface thereof. End plate 14 is secured to the housing flange 15 by means of a plurality of bolts 144.

A spring-loaded valve drive assembly 146 used to effect movement of shaft 26, and thus actuation of the valve seal assembly 18 disposed within the valve seal support enclosure 16, as shown in FIGURES 1–3, utilizes a spring 148 coaxially disposed about shaft 26. The spring 148 is confined between the spring support plate 142 and a spring collar 150 which is coaxially secured to the shaft 26 by means of a pin 152. Pin 152 extends radially outward to protrude at its free end through an axially extending slot 154 formed in the wall of the upper housing section 36. The collar 150 is located on shaft 26 to provide the desired compression upon spring 148 commensurate with the amount of force required to effect a vacuum seal.

Actuation of the valve seal assembly 18 is effected by a valve actuating assembly 156, supported within a support member 158 rigidly secured as by welding to the housing end plate 14. A thick support cap 160 is secured as by welding to the upper end of the support member 158, and has a threaded hole formed therein in alignment with the end of shaft 26. Manual means for initiating motion of the shaft 26 utilizes a threaded shaft 162 rotatably disposed within the threaded hole of support cap 160 and having threads matching those thereof, and a manually operable knob 164 rigidly secured to the exterior end thereof. Threaded shaft 162 extends into the support member 158 to approach the end of shaft 26 in alignment therewith. A ball bearing 166 is confined between the adjacent ends of the threaded shaft 162 and the shaft 26 is retained by being welded to shaft 162 and provides low friction rotation of threaded shaft 162 relative to shaft 26. Pins 168 extend radially inward from the wall of member 158 in predetermined spaced-apart relation, and bear against an axially-translatable indent stop 170 which rotates with threaded shaft 162, to provide means for limiting the extent of rotation and thus the axial travel of the threaded shaft 162.

Thus, actuation of the valve of FIGURE 4 is effected by unscrewing the threaded shaft 162 to its upper limit, simultaneously allowing spring 148 to urge shaft 26 upwardly to place the desired force upon the valve seal assembly 18. The valve position is indicated by the switch means 30 which is activated by the protruding end of pin 152, as described in conjunction with the valve of FIGURES 1–3.

It is noted that in both of the embodiments shown the shaft 26 travels within two bearings which in FIGURES 1–3 comprise holes in plates 38 and 14 and which in FIGURE 4 comprises holes in plates 142 and 14. A thin coating of a suitable permanent lubricant such as molybdenum disulfide which is unaffected by the radiation environment is applied to the shaft 26 during assembly of the valve. Note also that crossbar 64 as shown in FIGURES 2–3 is affixed to the bottom of disc 54 at an angle thereto, thus placing a curvature upon the flexible member 62. Thus, at such time as the valve closes in operation, the member 62 and crossbar 64 lie in nearly a straight line with the shaft 26 being actually inclined past center thereby providing the maximum amount of strength to withstand the closure force with a minimum of strain upon the members during all phases of valve operation.

In operation, it is desirable to prevent excessive upward force upon the movable members of the valve 10 upon closure. To this end the air cushion assembly 24 acts to reduce the force exerted by the spring 68 upon closure of the valve shortly after the initiation of vertical motion due to the vacuum produced under piston 98 within the piston housing 99. During the initial travel of piston 98 upwardly for approximately one-third of the full stroke thereof a substantial vacuum exists under the piston 98, and limits the acceleration of the shaft to substantially less than 200 times the acceleration of gravity whereas without the vacuum condition, the acceleration would approach 300 times the acceleration of gravity. During the initial motion of piston 98, little damping occurs due to the orifice bushing 114 because the head space volume within the piston housing 99 has changed relatively little during the first ⅓ of the stroke of the piston 98 and the pressure buildup therein is slight. After approximately ⅓ of the stroke the lower surface of piston 98 passes the circumferential groove 104 and air is admitted into the housing 99 below the piston 98 via the communicating holes 106. The piston 98 moves above the groove 104 in approximately 2 milliseconds at which time the damping is reduced allowing full acceleration of the shaft 26 and the attached valve seal assembly 18. During the middle third of the piston 98 travel, the pressure buildup within the head volume of the housing 99 becomes significant and approaches a valve sufficient to cause deceleration of the piston 98 at approximately ⅔ of the piston travel, the amount of damping being regulated by the orifice bushing 114. During the last ⅓ of the travel of piston 98, the pressure buildup within the head volume becomes several atmospheres and causes the piston 98 and integrally coupled shaft 26 to decelerate at a peak of approximately 300 times the acceleration of gravity.

Actuation of the valve 10 of the present invention is initiated by an exterior circuit (not shown) which in the particular application herein described in conjunction with the use of valve 10 senses any deterioration of the vacuum in the accelerator waveguide tube and introduces a signal to the solenoid 92. Actuation of solenoid 92 forces plunger 95 against the ring 90 whereupon latching hooks 82, 84 are disengaged from latch bars 78, 80 respectively. Spring 68 forces the shaft 26 upwardly against the damping action of the piston 98 hereinbefore described and seal seat disc 54 is pressed against the knife-edge 52 to effect a vacuum seal therebetween.

At such time as repairs to the accelerator system are made and the valve is to be reopened, three-way valve 112 is opened to allow high pressure air supply 28 to introduce air at approximately 90 lbs. per square inch to the head volume above piston 98 via the air supply tube 110 and orifice bushing 114. The piston 98 is driven downwardly against the force of the spring 68 and latch bars 78 and 80 contact the slanted surface formed at the upper ends of latching hooks 82, 84 respectively causing the hooks to be deflected away from the bars 78, 80. The spring return device 83 maintains an opposing force against the ring 90 and thus the latching bars 82, 84 whereupon the latch grooves 86, 88 engage the latch bars 78, 80 respectively upon further downward travel of the piston 98. During the last one-third of the travel of piston 98, the air trapped under the piston below the circumferential groove 104 is allowed to leak between the piston and cylinder piston housing 99 and escape via groove 104 and holes 106 into the atmosphere. The piston walls have no seals but are permanently lubricated by a thin coating of lubricant of the type described above, e.g., molybdenum disulfide. At such time as the valve is recocked, the high pressure air supply 28 is turned off and the valve 10 is prepared for a subsequent cycle.

The valve 10 can be cycled, closed and opened some 20 to 30 times with the indentation made by the knife-edge 52 into the cold indium seal-seat 66 gradually becoming deeper with each closure. At such time as a maximum allowable depth of indentation is reached the seal-seat in a horizontal position may be re-formed by melting. To this end the heater coil 116 is energized to heat the integral cover 118. Heat is transferred by radiation to crossbars 64 and disc 54. After the indium has achieved a liquid state and has re-formed, the heater coil 116 is de-energized to allow rapid cooling of all heated parts and solidification of the indium seal-seat.

While the invention has been disclosed with respect to several embodiments, it is apparent to those skilled in the art that numerous variations and modifications may be made within the spirit and scope of the invention; thus it is not intended to limit the invention except as defined in the following claims.

What is claimed is:

1. In a fast-closing high-vacuum valve, the combination comprising;
   (a) a generally annular valve body provided with coaxially aligned port means in opposing end walls for coupling to evacuable components of a vacuum system;
   (b) a valve seal assembly disposed in said housing including a generally circular tubular conduit communicating in sealed relation with one of said ports with the axis of said conduit and defining a longitudinal axis of said body, said conduit terminating within said body in a generally planar seat end angularly inclined to said axis;
   (c) a generally planar valve closure disc pivoted for movement from an open position offset from the axis of said conduit into compliant closed contact with the seat end of said conduit;
   (d) a shaft extending in reciprocating sealed relation to the radial wall of said valve body;
   (e) compliant link means coupled to the end of said shaft within said body and engaging said valve seat disc to actuate movement thereof from an open offset to a closed seat engagement position;
   (f) actuating means including a spring coupled to said shaft exteriorly of said body and deformable to exert a closing force on said shaft;
   (g) latch means for retaining said spring in deformed position with said shaft and disc in a depressed open position;
   (h) means for disengaging said latch means to permit said spring to drive said shaft and in turn the coupled disc into closed engagement with said seat; and
   (i) snubber means coupled to said shaft for decelerating the terminal velocity thereof to control the impact velocity of said closure disc on said valve seat.

2. Apparatus as defined in claim 1 wherein means are coupled to said shaft to effect opening reciprocating motion thereof to depress said spring and said latch means retains said spring in reset deformed position with said shaft and disc coupled thereto being in open position.

3. In a fast-closing high-vacuum valve, the combination comprising;
   (a) a generally annular valve body provided with coaxially aligned port means in the end walls for coupling to conduit portions of a high-vacuum system, said valve body including support structure extending exteriorly of the radial wall thereof;
   (b) a valve seal assembly disposed in said housing including a generally circular tube extending coaxially in sealed relation from a position circumjacent one of said ports and terminating in a generally planar conic section valve seal seat within said body angularly disposed to the axis of said tube;
   (c) a generally planar valve closure disc assembly including a flexible hinge member secured at one end in fixed position within said housing and at the other end to said disc so that the disc pivots from an open position offset from said seat into compliant closed contact with said seat in a second position;
   (d) a shaft extending in reciprocating sealed relation from within said body to within said support structure;
   (e) link means coupled to the inner end of said shaft and engaging said valve seat disc to actuate movement thereof from an open offset position into compliant closed contact with said valve seal seat;
   (f) actuating means associated with said support structure including a compression spring coupled to said shaft to exert an outward restoring force thereon;
   (g) latch means for retaining said spring in a compressively deformed position with said shaft and coupled disc in depressed open position;

(h) means for disengaging said latch means to permit said spring to drive said shaft and in turn the disc coupled thereto into closed engagement with said seat;

(i) snubber means coupled to said shaft and effective to decelerate said shaft in the terminal stage of closure motion; and (j) means coupled to drive said shaft inwardly to depress said spring to be retained in open set position by said latch means.

4. Apparatus as defined in claim 3 wherein said tube is arranged with the apex of said conic section seat oriented towards said shaft; said disc is disposed oppositely across said tube with respect to the inner end of said shaft; and said link means includes a crossbar on the inner end of said shaft and flexible link members extending therefrom to engage a crossbar member which engages said disc.

5. Apparatus as defined in claim 4 wherein said seat is provided as a knife-edge, a groove corresponding to said knife-edge is provided in face portions of said disc, and a reformable sealing seat medium is disposed in said groove.

6. Apparatus as defined in claim 4 wherein said seat is provided as a knife-edge, a groove corresponding to said knife-edge is provided in face portions of said disc, low melting point indium metal is disposed as a sealing medium surface in said groove, and a means is provided in said body for heating said disc to melt the indium metal to reform the sealing surface.

7. Apparatus as defined in claim 3 wherein said latch means includes latch hooks pivoted at one end and having indentations for engaging a latch bar coupled to retain said spring in compressed condition, and said means for disengaging the latch means includes a plunger means arranged to exert a lateral force to the free ends of said latch hooks effective to release said latch bar therefrom.

8. Apparatus as defined in claim 3 wherein said snubber means includes a gas cylinder carried by said support means with the piston coupled to said shaft, said cylinder being provided with an orifice of a diameter selected to provide an effective deceleration at the end of travel of said shaft.

9. Apparatus as defined in claim 3 wherein a double-acting air cylinder is carried by said support means with the piston coupled to said shaft, one portion of said cylinder being provided with an orifice of a diameter selected to provide a snubbing deceleration to said shaft in a closing operation and a second portion adapted for introduction of air pressure therein effective to compress said spring.

References Cited

UNITED STATES PATENTS

| | | | |
|---|---|---|---|
| 603,144 | 4/1898 | Kellerman et al. | 251—228 X |
| 1,006,108 | 10/1911 | Lundberg | 251—303 X |
| 1,782,238 | 11/1930 | Kirchhan | 251—228 |
| 3,006,596 | 10/1961 | Nelson | 251—228 X |
| 3,134,271 | 5/1964 | Ray | 251—68 X |
| 3,259,357 | 7/1966 | Sharp | 251—69 |

M. CARY NELSON, *Primary Examiner.*

ARNOLD ROSENTHAL, *Examiner.*